Nov. 3, 1925.

C. A. BAKER 1,559,927

FISHING REEL

Filed Nov. 23, 1924

INVENTOR
Charles Alma Baker
BY
Henry M. Bushnell
his ATTORNEY

Nov. 3, 1925.
C. A. BAKER
FISHING REEL
Filed Nov. 28, 1924    3 Sheets-Sheet 2
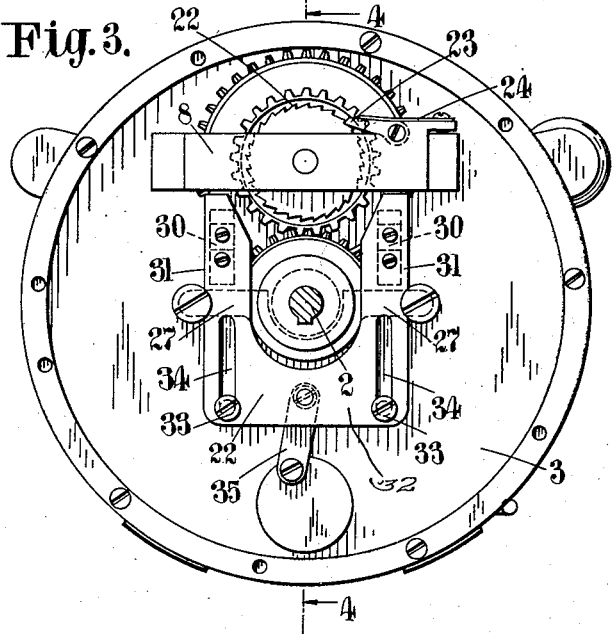
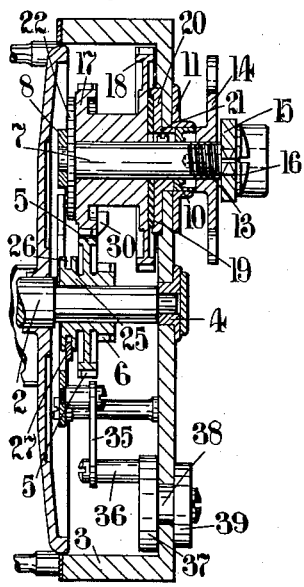 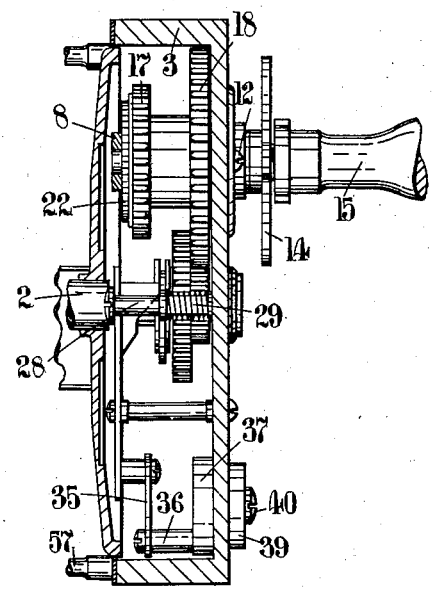
INVENTOR
Charles Alma Baker
BY
Henry D. Brigham
his ATTORNEY Nov. 3, 1925.

C. A. BAKER 1,559,927

FISHING REEL

Filed Nov. 28, 1924     3 Sheets-Sheet 3

C. Alma Baker
INVENTOR

Henry M. Brigham BY
his ATTORNEY

Patented Nov. 3, 1925.

1,559,927

UNITED STATES PATENT OFFICE.

CHARLES ALMA BAKER, OF BATU GAJAH KINTA, PERAK, FEDERATED MALAY STATES.

FISHING REEL.

Application filed November 28, 1924. Serial No. 752,572.

*To all whom it may concern:*

Be it known that I, CHARLES ALMA BAKER, C. B. E., a British subject, residing at Batu Gajah Kinta, Perak, Federated Malay States, have invented a new and useful Improved Fishing Reel, of which the following is a specification.

This invention relates to fish line reels and more particularly to fish line reels of the kind comprising a fish line reel mounted on a shaft adapted to be rotated in one direction by a driving gear operated by a crank or the like.

Such fish line reels as heretofore constructed suffer from the disadvantage that the reel shaft can be rotated by the driving gear at one speed only. This is not always advantageous as in many instances it is desirable that the line be wound quickly on the reel and it is an object of the present invention to provide means whereby the reel shaft can be rotated at a relatively high speed and consequently the line wound quickly on the reel when desired.

A further object of the invention is to provide improved means whereby the reel shaft may be entirely disconnected from the driving gear whereby the reel shaft and consequently the reel is released for free rotation.

Another object of the invention is to provide an improved brake for the reel which is manually controlled so as frictionally to retard or stop the rotation of the reel.

These and other objects and advantages will be hereinafter more fully explained and for this purpose reference will now be made to a preferred embodiment of the invention illustrated by way of example on the accompanying drawings wherein:

Figure 3 is an end elevation of the driving mechanism with the reel removed,

Figure 4 is a section on the line 4—4 of Figure 3,

Figure 5 is a front view of the driving mechanism with the enclosing casing or gear box broken away to show more clearly said mechanism the latter being in a different position to that shown in Fig. 4 and, Figure 6 is a view on the line 6—6 of Figure 1 looking in the direction of the arrows.

Figure 2:
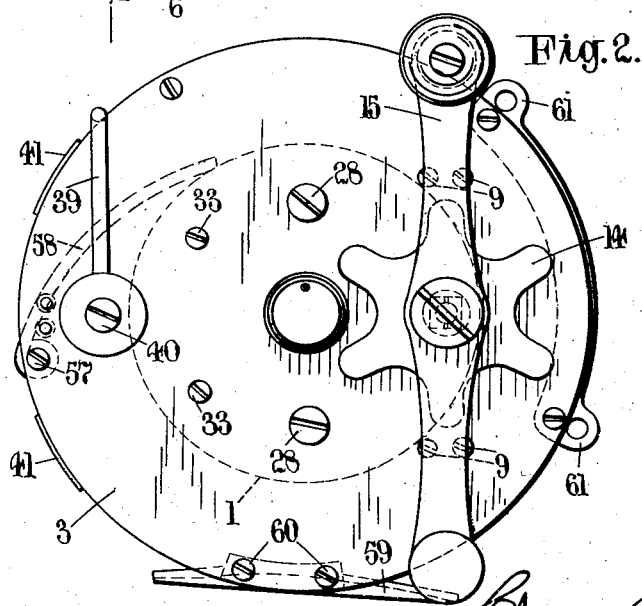
Figure 2 illustrates an end view thereof.

Referring to the drawings wherein the same reference numerals indicate the same or similar parts 1 Fig. 2 is the fish line reel which is mounted on a shaft 2 Figs. 3–5 so as to rotate therewith said shaft having a portion projecting beyond the reel into a shallow gear box 3 one end of said shaft being supported in a bearing 4 provided on the gear box 3.

The projecting portion of the shaft is of reduced diameter and has gear members 5 and 6 slidably mounted thereon said gear members being formed integrally one with the other and being feathered to said shaft so that the shaft 2 and gear members 5 and 6 will rotate together.

For the purpose of driving said gear members 5 and 6 and consequently the reel shaft 2 and reel 1 I provide a frictional driving mechanism comprising a spindle 7 Fig. 4 journalled at one end on a bridge piece 8 secured in any suitable manner as by screws 9 Fig. 2 to the gear box 3 the opposite end of the spindle 7 being supported in a journal 10 slidable in a socket 11 secured to the outside of the gear box 3 as by screws 12 Fig. 5.

The spindle 7 is provided with a threaded portion 13 on which is mounted a capstan drag 14 said spindle having also a crank handle 15 secured thereto as by a screw 16 whereby said spindle may be manually rotated.

Loosely mounted on the spindle 7 are two gear members 17 and 18 formed integrally one with the other and adapted to be engaged by the slidable gear members 5 and 6 on the reel shaft 2.

In order that the gear members 17 and 18 may be caused to rotate with the spindle 7 I provide a friction clutch device comprising a washer 19 of leather fibre or other suitable material which is acted on by a disc 20 having a flange 21 in contact with the slidable bearing 10. By rotating the capstan drag 14 in one direction the bearing 10 is caused to move inwardly by the threads 13 and the washer 19 is tightly pressed against the gear member 18 whereby the gear members 17 and 18 will rotate with the spindle 7 on rotation of the latter by the crank 15.

Any suitable means may be provided for preventing rotation of the spindle 7 in the reverse direction. One convenient arrangement comprises a ratchet wheel 22 secured to the spindle 7 and engaged by a pawl 23 on the bridge piece 8 the pawl being held in engagement with the wheel 22 by a spring 24.

If desired a washer of leather fibre or other suitable material may be inserted between the ratchet wheel 22 and the gear member 17.

For sliding the gear members 5 and 6 on the shaft 2 said members are provided with a projecting portion 25 having a groove 26 with which a bar 27 is in engagement said bar being slidable on pillars 28, Figs. 2 and 5.

Springs 29 tend normally to press the bar 27 and consequently the gear members 5 and 6 away from the gear member 18.

In order to move the gear members 5 and 6 against the action of the springs 29 tapered cams 30 are provided said cams being mounted on the underside of arms 31 of a member 32 guided for sliding movement in the gear box 3 by pins 33 engaging slots 34 in said member.

An arm 35 is pivoted at one end thereof to the member 32 said arm being connected to a post 36 on a disc 37 having a pivot pin 38 extending through the gear box 3 and to which an operating handle 39 is secured as by means of a screw 40.

In one position of the handle 39 the gear member 5 is in engagement with the gear member 17 the gear ratio between said members being in the example illustrated 1:1. If now the arm 39 is moved to the middle or neutral position the member 32 will be moved downward Fig. 3 and the cams 31 will act on the bar 27 and move said bar and consequently the gear members 5 and 6 against the action of the springs 29. In the neutral position the gear members 5 and 6 are out of engagement with the members 17 and 18 so that what is known as a "free spool" is obtained in this position. On further moving the handle 39 the member 32 is moved still further downward Fig. 3 whereby the cams 30 acting on the bar 27 will cause the gear member 6 to engage the gear member 18 Fig. 5 the ratio of the gears 18 and 6 being in this case as 3½:1.

The gears 5, 17 and 6, 18 may be of any desired size so that different gear ratios may be obtained.

By the arrangement described it is possible to drive the reel shaft 2 at two different speeds but it will be obvious to those skilled in the art that means may be provided whereby a greater number of different speeds may be obtained.

The improved friction drive also permits slipping of the reel with respect to the rotating crank 15 when a sufficient tension or load is exerted on the line by the fish that may be attached thereto. This prevents the line from snapping or being broken which frequently occurs in reels which are not under a friction or yielding control. Furthermore by simply rotating the capstan drag 14 to retract along the threaded portion 13 the clutch members are released and the frictional drag on the reel 2 consequently decreased.

If desired indicators such as plates 41 may be provided on the gear box 3 to indicate the gear ratio corresponding to the position of the handle 39.

Figure 1:
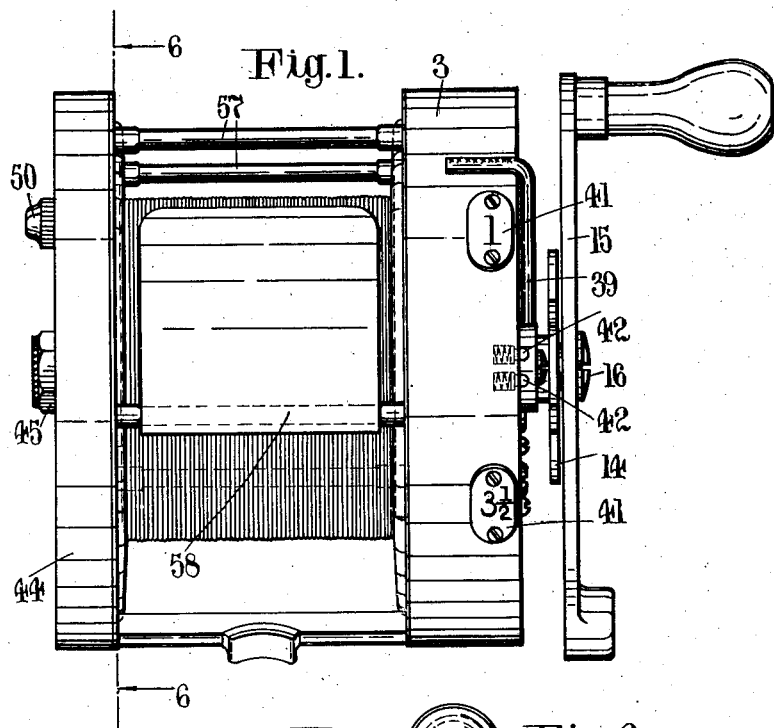
Figure 1 shows a front elevation of the improved reel.

Means may also be provided to positively retain the handle 39 and consequently the gears 5 and 6 in the neutral or "free spool" position. Such means may comprise spring pressed plungers 42 Fig. 1 on the gear box adapted to engage recesses in the handle 39 whereby the "free spool" position will be maintained until a positive force is applied to the handle 9 to move said handle away from the neutral position. Instead of this arrangement a spring pressed plunger may be located in the post 36 said plunger being adapted to engage a recess in the box 3 when the mechanism is in the neutral or "free spool" position.

Figure 6:
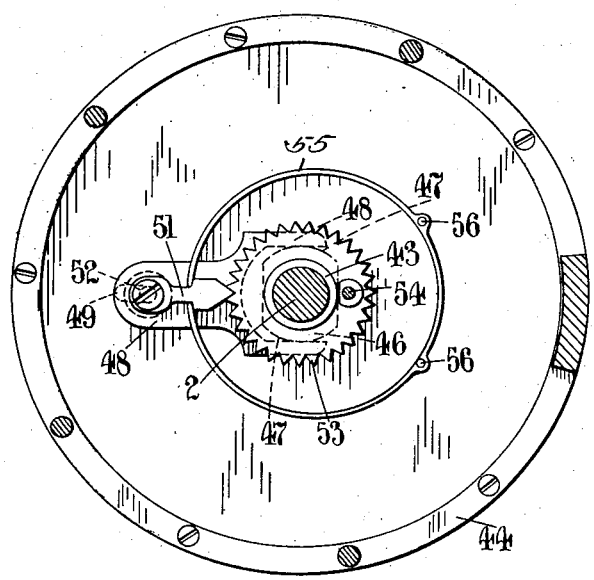

For supporting the opposite end of the shaft 2 I provide a bush 43, Fig. 6 supported in a shallow end box 44 and secured in position by a nut 45 engaging a threaded portion on said bush. The inner portion of the bush 43 is provided with a washer 46 having surfaces 47 for guiding a fork 48 slidably mounted in the interior of the box 44 for which purpose the box has a slot 49 through which a pin 50 extends. The pin 50 also passes through a hole in the fork and the inner end of said pin has a finger 51 secured thereto by means of a screw 52 which serves to secure the pin 50 the fork 48 and the finger 51 together.

By sliding the pin 50 towards the shaft 2 the finger 51 can be brought into engagement with a ratchet wheel 53 secured to the reel by a pin 54. A circular spring 55 secured to the box 44 by pins 56 has a portion cut away to embrace the finger 51.

By means of this arrangement an audible signal is given to the fisherman when the line is running out. It is well known that occasionally the attention of the fisherman becomes distracted and when in this condition if a bite is obtained the first indication thereof received by the fisherman is a snap or tug on the line when the line has run out which may result in breaking the line and consequent loss of the fish. By means of the arrangement above described whenever the line begins to run out as when a bite is obtained a series of clicks is heard owing to the slipping of the ratchet wheel 53 on the finger 51 whereby the fisherman's attention is drawn to the fact that the line is running out.

The box 44 and gear box 3 are held in spaced relation by spacing members 57.

Means are also provided for exerting a brake on the reel when desired and in one convenient arrangement the brake comprises a piece of leather or other suitable material 58 which is secured to one of the spacing members 57 in such a manner that it can be pressed by a thumb or finger against the reel when desired.

The reel is adapted to be secured to a rod by means of the plate 59 secured to the boxes 3 and 44 as by screws 60 and the reel may be secured to the fisherman's harness in any convenient manner such as by the eyes 61.

While I have described the preferred construction of parts and operation thereof I am aware that numerous changes of construction and operation may be made without departing from the spirit and scope of the invention and I therefore do not wish to be understood as limiting the scope of my claims by the positive terms employed in connection with the description.

I claim:

1. A fish line reel comprising a reel, a reel shaft, a plurality of gear members on said shaft, a driving spindle, means for rotating the spindle, a plurality of gear members on said spindle adapted to co-operate with the gear members on the shaft and means for moving the gear members on the shaft into engagement with the gear members on the spindle whereby said shaft can be driven at a plurality of speeds.

2. A fish line reel comprising a reel, a reel shaft, a plurality of gear members of varying diameters slideably mounted on said shaft so as to rotate therewith, a driving spindle and a plurality of gears of varying diameters loosely mounted on said spindle, the respective slideable gears on the reel shaft being adapted to be shifted into mesh with their complementary gear members loosely mounted on the spindle and to co-operate therewith so as to give the desired speed ratio to the reel shaft and a crank rotating the spindle, clutch members for frictionally connecting the spindle and the gear members thereon and a capstan drag on said spindle to apply and release the clutch members.

3. A fish line reel comprising a reel shaft, a plurality of gear members of varying diameters slideably mounted on said shaft so as to rotate therewith, a driving spindle, a plurality of gears of different diameters on said spindle, means for shifting the respective gear members slideably mounted on the gear shaft into engagement with their complementary gears on the driving spindle so as to produce the desired speed ratio, a crank for rotating the spindle and means whereby the gear members on the shaft may be disconnected from the gear members on the spindle so as to obtain a free running spool.

4. A fish line reel comprising a reel, a reel shaft, a plurality of gear members of varying diameters slideably mounted on said shaft so as to rotate therewith, a driving spindle, a plurality of gear members of varying diameters on said spindle, means for moving the respective gear members on the reel shaft into engagement with their complementary gear members on the spindle so as to give the desired speed ratio, one of the gear members on said reel shaft being normally in engagement with one of the gear members on the driving spindle, a crank for rotating the spindle, means for moving the gear members on the shaft out of engagement with the gear members on the spindle so as to obtain a free spool condition and means for retaining the gear members on the shaft in such position.

5. A fish line reel comprising a reel, a reel shaft, a plurality of gear members of different diameters slidably mounted on said shaft so as to rotate therewith, a driving spindle, a plurality of gear members of different diameters loosely mounted on said spindle, a crank for rotating the spindle, clutch members for frictionally connecting the spindle and the gear members thereon, a capstan drag on said spindle to apply and release the clutch members, and means for moving any of the gear members on the shaft into engagement with a desired gear member on the spindle whereby the shaft can be driven at the desired speed.

6. A fish line reel comprising a reel, a reel shaft, a plurality of gear members on the shaft, a spindle, a plurality of gear members on the spindle, a crank for rotating the spindle, and means for moving the gear members on the shaft into engagement with the desired gear member on the spindle comprising a spring-controlled bar in engagement with the gear members on the shaft, a slidable member, cams thereon adapted to engage the bar and to move said bar against the action of the springs, a rotatable disc member connected to said sliding member and a handle for operating said disc member.

7. A fish line reel comprising a reel, a reel shaft, a plurality of gear members on said shaft, a spindle, a plurality of gear members on said spindle adapted to co-operate with the gear members on the shaft, a crank for rotating the spindle, means for moving the gear members on the shaft into or out of engagement with the gear members on the spindle and means for indicating the position of the gear members on the shaft.

8. A fish line reel comprising a reel, a reel shaft, a plurality of gear members on said shaft, a spindle, a plurality of gear members on the spindle, adapted to co-operate with the gear members on the shaft, a crank for rotating the spindle, means for moving the gear members on the shaft into or out of engagement with the gear members on the spindle, and brake means adapted to be applied by hand against the reel.

C. ALMA BAKER.